H. G. TUCKER.
JACK TRUCK.
APPLICATION FILED JAN. 8, 1917.
1,282,988.
Patented Oct. 29, 1918.
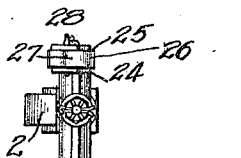
Fig. 1.
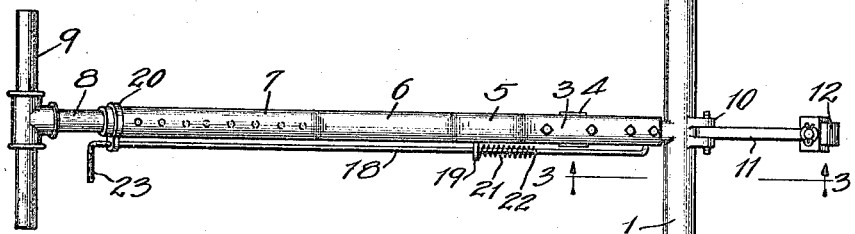
Fig. 4.
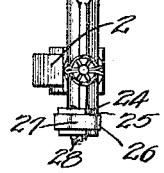
Fig. 2.
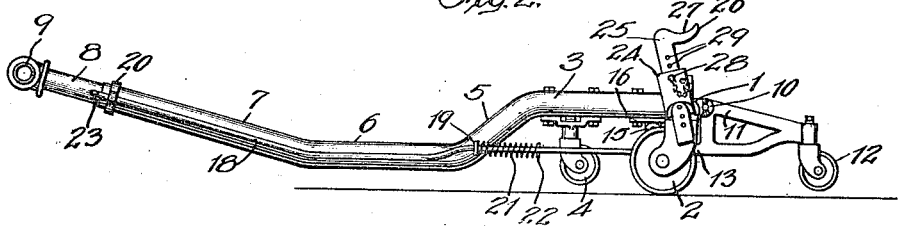
Fig. 3.
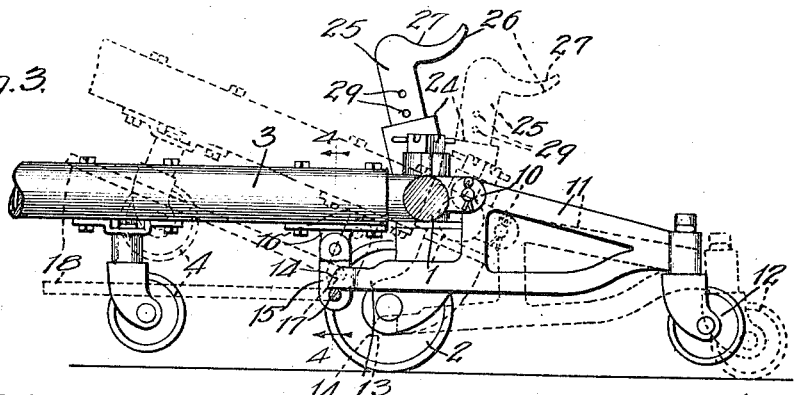
Witnesses:
W. F. Kilroy
Harry R. L. White
Inventor
Holling G. Tucker
By Rudolph M. Lotz, Atty.

UNITED STATES PATENT OFFICE.

HOLLING G. TUCKER, OF CHICAGO, ILLINOIS.

JACK-TRUCK.

1,282,988.  Specification of Letters Patent.  Patented Oct. 29, 1918.

Application filed January 8, 1917.  Serial No. 141,287.

*To all whom it may concern:*

Be it known that I, HOLLING G. TUCKER, citizen of the United States, residing at Chicago, in the county of Cook and State of Illinois, have invented certain new and useful Improvements in Jack-Trucks; and I do hereby declare the following to be a full, clear, and exact description of the invention, such as will enable others skilled in the art to which it appertains to make and use the same.

This invention relates to improvements in jack trucks particularly adapted for use in garages and repair shops for quickly and easily raising and lowering one end of an automobile, auto truck, or other vehicle for the purpose of making sharp turns for positioning such vehicle in a small space between other vehicles, and for purposes of removing and replacing wheels, tires and the like.

The main object of the present invention is to provide a jack truck of the character defined which will occupy small space and may be very easily and quickly manipulated to attain the ends above set forth.

The invention consists in the features of construction and combinations of parts hereinafter fully described and particularly claimed.

In the accompanying drawings illustrating the invention:

Figure —1— is a plan view of a jack truck constructed in accordance with my invention.

Fig. —2— is a side elevation of the same.

Fig. —3— is a fragmentary detail longitudinal section of the same on the line 3—3 of Fig. —1— showing the operative parts of the truck in two positions in full lines and dotted lines, respectively.

Fig. —4— is a detail vertical section on the line 4—4 of Fig. —3—.

My said device comprises a suitable bar 1 which is equipped contiguous to its ends with rotatable caster-wheels 2 which may be swung on vertical axes relatively to the said bar 1 so that the latter may be moved over the floor in any desired direction in a well-known manner. Rigidly secured to the bar 1 midway between its ends is a tongue 3 extending transversely thereto, and which is similarly equipped contiguous to its connection with said bar 1 with a rotatable caster wheel 4 which is smaller than the caster wheels 2, and the tread of which is disposed at a less distance below said tongue 3 than the tread of the caster wheels 2. The said tongue 3 is bent between its ends substantially as shown in Fig. —2—, that is to say, that it dips down, as at 5, and is then provided with a substantially horizontal portion 6 and terminates in an upwardly inclined portion 7. The said tongue or pole 3 is preferably tubular and the straight portion 7 thereof telescopically receives a handle member 8 provided with a cross-head 9. The said handle member 8 is adapted to be adjusted longitudinally of the portion 7 of the pole 3 to lengthen or shorten said pole, as desired, in order to increase or decrease the leverage adapted to be exerted as hereinafter more particularly described.

The bar 1 is provided directly opposite its connection with the pole 3 with a bifurcated projection 10 in which the frame 11 carrying a caster wheel 12, similar to the caster wheel 4, is mounted. The caster wheel 12 is disposed substantially the same distance forward of the bar 1 as the caster wheel 4 is disposed rearwardly thereof. The said frame 11 is further provided with a rearwardly extending tongue or projection 13 having a beveled end 14. The said end of said projection 13 is adapted to be received between the depending parallel links 15 pivotally suspended from a projection 16 on the lower face of the pole 3 between the bar 1 and the caster wheel 4. The said links 15 are pivotally secured at their lower ends to the transverse end portion 17 of a rod 18 which is longitudinally movable in guides 19 and 20 mounted upon the pole 3. The said transverse portion 17 of said rod 18 constitutes a support for the said tongue 13 of the frame 11 and is held in position to support the latter by means of the helical compression spring 21 bearing at one end on the guide 19 and at its other end on a collar 22 mounted on said rod 18. The latter is provided at its other end with a lateral projection 23 adapted to be manually engaged for moving said rod 18 longitudinally against the action of the spring 21 to release the tongue 13 from engagement between the links 15 and the transverse portion 17 of said rod.

At its extreme ends the said bar 1 carries a pair of rectangular sleeves 24, each of which receives a telescopically movable standard 25 provided at its upper end with a lateral projection 26 having a concave upper face 27. When the said bar 1 and pole 3 are positioned as shown in Fig. —2— the said sleeves 24 will extend at a slight rearward incline from a vertical position so that the center of gravity of a load carried by the lateral projections 26 of the standards 25 will be substantially through the middle of said bar 1. It will be noted that said projections 26 extend forward of the bar 1 in the direction of the caster wheel 12. In operation, when it is desired to raise one end of a vehicle, the said truck is moved forward so that the frame 11 and caster wheel 12 are positioned below the axle at the front or rear of the truck. The rod 18 is drawn rearwardly so as to release the tongue 13 from engagement with the part 17 and the pole 3 is raised so as to throw the projections 26 and standards 25 to the positions shown in dotted lines in Fig. —3—. The elevation of said projections 26 will have been first adjusted by means of pins 28 passing through the perforations 29 in the standards 25 so that by moving the truck farther forward when the standards are so positioned the axle of the vehicle will be received in the concave upper faces of the said projections 26. By then lowering the pole 3 to the position shown in full lines in Figs. —2— and —3— the said axle will be lifted from the floor and will become supported upon the caster wheels supporting the bar 1. It will be obvious that in moving the caster wheels 2 will occupy the position shown in Figs. —1—, —2— and —3—, so that upon raising the pole 3, as shown in dotted lines in Fig. —3—, the said projections 26 will swing on the horizontal axes of rotation of the wheels 2.

As the pole 3 is lowered, after engaging the axle in the said projections 26, the tongue 13 will spring back into engagement with the member 17, shown in full lines in Fig. —3—, thus preventing the weight of the load carried on the projections 26 from swinging the pole upwardly and dropping the load.

It will be noted that both caster wheels 4 and 12 are so positioned relatively to the caster wheels 2 that only one of said wheels 4 or 12 may move along the floor simultaneously with the caster wheels 2. Thus the bar 1 is permitted a slight rocking movement on the horizontal axes of the caster wheels 2 when carrying a load, or the load may be carried by said caster wheels 2 together with either of the caster wheels 4 or 12. If the axle of the vehicle is supported upon the said projections 26 of the standards 25 the bar 1 may obviously be moved in any desired direction to move the end of the vehicle carried thereby laterally or at any desired angle, thus enabling such vehicle to be easily moved to occupy any desired space in a garage, or the like, and may be maintained supported on said truck for purposes of repair, such as removing and replacing tires, wheels, etc.

When the vehicle has been moved to the desired position upon the truck the load upon the latter may be slowly and easily lowered by first releasing the member 17 from engagement with the tongue 13, and then slowly raising the pole 3 until the wheels of the vehicle again rest upon the floor, whereupon the projections 26 are withdrawn from beneath the axle supported thereby, as will be obvious.

The bar or shaft 1 and the pole or lever 3 thereof, together constitute a T-shaped carriage for the supporting members 25 and the load thereon.

While I have shown the preferred embodiment of my invention in the accompanying drawings it will be obvious, of course, that such embodiment may be changed and varied to adapt the device to various purposes without departing from the invention as defined in the appended claims.

I claim as my invention:

1. A combined vehicle jack and truck comprising a bar supported on caster wheels, laterally spaced upstanding members rigid with the ends of the bar and formed at their free ends for engagement with a vehicle axle, a tongue rigid with the bar and extending transversely thereto, said tongue and upstanding members adapted to swing on the horizontal axes of said caster wheels to raise and lower the axle-engaging ends of said upstanding members, an arm pivoted to said bar opposite to said tongue, a caster wheel on the outer end of said arm, a rigid projection on said arm extending beneath said bar and said tongue, means for automatically locking said projection with said tongue as the latter is lowered, and a rod carried by said tongue for effecting the release of said projection from engagement with said tongue.

2. A combined vehicle jack and truck comprising a bar supported on caster wheels, laterally spaced upstanding members rigid with the ends of the bar and formed at their free ends for engagement with a vehicle axle, a tongue rigid with the bar and extending transversely thereto, said tongue and upstanding members adapted to swing on the horizontal axes of said caster wheels to raise and lower the axle-engaging ends of said upstanding members, an arm pivoted to said bar opposite said tongue, a caster wheel on the outer end of said arm, and a latch rod carried by said tongue and provided at one end with a locking projection for engagement with said arm for locking the latter in supporting position relatively to said bar, the other end of said rod provided with a handle disposed contiguous to the outer end of said tongue for the manual operation of said rod.

3. A jack-truck comprising a T-shaped carriage supported at the ends of the cross-arm thereof on caster-wheels, the other arm thereof constituting a lever for swinging the cross-arm on the horizontal axes of said caster-wheels, a pair of axle-engaging and supporting members mounted on the ends of said cross-arm and adapted to be inserted underneath the axle to be raised as said lever is raised, and to raise said axle as said lever is lowered, a frame pivotally secured to said cross-arm and projecting therefrom in the opposite direction from the lever - arm thereof, a tongue on said frame projecting underneath said cross-arm, a spring-held manually operable latch member on said lever-arm adapted to engage said tongue to hold said frame against pivotal movement relatively to said cross-arm, and a caster-wheel on said frame adapted to coact with said caster-wheels on said cross-arm to support a load.

In testimony whereof I have signed my name in presence of two subscribing witnesses.

HOLLING G. TUCKER.

Witnesses:
P. T. FREDRICKSEN,
F. J. O'BRIEN.

Copies of this patent may be obtained for five cents each, by addressing the "Commissioner of Patents, Washington, D. C."